(12) United States Patent
Chikaoka

(10) Patent No.: US 9,202,434 B2
(45) Date of Patent: Dec. 1, 2015

(54) IMAGE DISPLAYING DEVICE

(71) Applicant: Funai Electric Co., Ltd., Osaka (JP)

(72) Inventor: Atsuhiko Chikaoka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 239 days.

(21) Appl. No.: 14/046,128

(22) Filed: Oct. 4, 2013

(65) Prior Publication Data

US 2014/0160141 A1 Jun. 12, 2014

(30) Foreign Application Priority Data

Dec. 10, 2012 (JP) ................... 2012-269114

(51) Int. Cl.
*G09G 5/02* (2006.01)
*H04N 9/31* (2006.01)

(52) U.S. Cl.
CPC ............... *G09G 5/026* (2013.01); *H04N 9/317* (2013.01); *H04N 9/3129* (2013.01)

(58) Field of Classification Search
None
See application file for complete search history.

(56) References Cited

U.S. PATENT DOCUMENTS

| 2009/0027567 A1 | 1/2009 | Nishimura et al. | |
| 2009/0153749 A1 | 6/2009 | Mixon | |
| 2011/0074660 A1* | 3/2011 | Hajjar et al. ................. | 345/75.1 |

FOREIGN PATENT DOCUMENTS

| JP | 3214211 B2 | 10/2001 |
| JP | 2005-031529 A | 2/2005 |
| JP | 2007-025522 A | 2/2007 |

OTHER PUBLICATIONS

Extended European Search Report for 13188773.9 dated May 9, 2014 (6 pages).
Office Action in corresponding European application No. 13188773.9 mailed Jul. 2, 2015 (5 pages).

* cited by examiner

*Primary Examiner* — Phi Hoang
*Assistant Examiner* — Mohammad H Akhavannik
(74) *Attorney, Agent, or Firm* — Osha Liang LLP

(57) ABSTRACT

An image displaying device includes laser beam sources that emit laser beams of mutually differing color components. The image display device projects an image based on a test pattern that includes a reference mark indicating horizontal and vertical reference positions by a mixed color of color components of the mutually differing color components, and bar marks arranged at specific intervals in the horizontal and vertical directions relative to the reference mark, for each color component, is used. Arrangement of the bar marks in the image data is an arrangement in which a distance from the reference mark is used as a reference, and for pairs of bar marks for bar marks of mutually differing color components, an amount of offset between bar marks in each of the bar mark pairs increases with fixed increments proportional to the distance from the reference mark.

8 Claims, 6 Drawing Sheets

IMAGE DISPLAYING DEVICE

FIELD OF TECHNOLOGY

The present invention relates to an image displaying device for projecting a color image by combining a plurality of laser beams of different color components.

BACKGROUND ART

Various types of image displaying devices that display color images on a projection plane through combining laser beams of a red component (R), green component (G), and blue component (B), and projecting onto a projection plane, as typified by a laser projector, for example, have been commercialized.

There have also been a variety of inventions proposed regarding such projection-type image displaying devices. For example, Patent Citation 1 discloses an invention of a projection-type display device having a plurality of optical signal generating means, driving means for each individual optical signal generating means, deflecting means provided in common for the optical signal generating means, and detecting means for detecting a dislocation angle of the deflecting means, wherein each driving means drive the respective optical signal generating means based on a detection result from the detecting means and based on a driving starting signal for each individual driving means.

Patent Citation 2, for example, discloses an invention of a projection-type image displaying device wherein an image that is free from color misalignment is displayed through scanning a beam with a time offset and modulating an image signal that is delayed by the time offset, and also achieves an improvement in safety and the display of a right image.

Patent Citation 3, for example, discloses an invention of an image displaying device wherein the amount of misalignment between a scan timing signal and a synchronization signal is detected through optical detection and a pixel timing signal is shifted in accordance with the detected amount of misalignment, to drive the beam source, to thereby achieve a high quality image.

PATENT CITATIONS

[Patent Citation 1] Japanese Patent 3214211
[Patent Citation 2] Japanese Unexamined Patent Application Publication 2005-31529
[Patent Citation 3] Japanese Unexamined Patent Application Publication 2007-25522

In an image displaying device that combines laser beams of individual color components and projects onto a projection plane, it is necessary to align the optical axes of the individual laser beams. This is because the feeling of resolution is lost due to misalignment of the display positions for R, G, and B on the projection plane in the individual pixels because of misalignment of the optical axes of the individual laser beams (a shift in the relative relationship between the laser beams) due to variability in manufacturing and due to changes over time.

Given this, conventionally, in order to correct optical axis misalignment, a test pattern, such as in FIG. 6, has been projected, and a user has adjusted the optical axes while viewing the test pattern that is displayed on the projection plane. That is, a reference mark, shaped as a +, for displaying a horizontal or vertical reference position is projected as a test pattern in a mixed color wherein all of the laser beams of the R, G, and B color components are combined. Given this, if the reference marks 61 are displayed on the projection plane in a state wherein they are separated into individual color components, this means that the optical axes are misaligned, so the optical axis misalignment is corrected through making fine adjustments to the individual modulation timings of the respective beam sources, through user instructions, so as to produce a mixed color wherein the individual reference marks 61 overlay each other.

SUMMARY OF THE INVENTION

In general, one or more embodiments of the present invention provide a technology that simplifies correcting of optical axis misalignment and wherein the amount of misalignment of the optical axes of the laser beams of the individual color components can be ascertained easily.

In one aspect of the present invention, an image displaying device may comprise: a plurality of laser beam sources that emit laser beams of mutually differing color components, wherein the image display device projects, based on image data, an image by scanning the laser beams of the mutually differing color components emitted from the plurality of laser beam sources, wherein the image data comprises image data of a test pattern that includes: a reference mark that indicates horizontal and vertical reference positions by a mixed color of a plurality of color components of the mutually differing color components; and a plurality of bar marks arranged at specific intervals in the horizontal and vertical directions relative to the reference mark, for each color component, is used, and wherein arrangement of the bar marks in the image data is an arrangement in which: a distance from the reference mark is used as a reference, and for pairs of bar marks for bar marks of mutually differing color components, an amount of offset between bar marks in each of the bar mark pairs increases with fixed increments proportional to the distance from the reference mark.

In one or more embodiments of the present invention, the user may be able to evaluate whether or not there is optical axis misalignment by viewing the reference marks that are projected. That is, when the reference marks are displayed on the projection plane in a mixed color of the individual color components that are emitted from a plurality of laser beam sources, it can be determined that there is no optical axis misalignment, but if the reference marks are displayed on the projection plane in a state that is divided into individual color components, it can then be determined that there is optical axis misalignment.

In one or more embodiments of the present invention, when there is optical axis misalignment, the user may be able to ascertain quantitatively the amount of optical axis misalignment (the amount of misalignment) by looking at a bar mark group that is displayed on the projection plane. That is, if, when there is optical axis misalignment, it is possible to find, from among the respective bar marks, those bar marks that overlay each other, then it is possible to back-calculate, from that pair of bar marks, the amount of optical axis misalignment. In this way, the image displaying device according to one or more embodiments of the present invention make it easy to ascertain the amount of misalignment of the optical axes of the laser beams of the individual color components, which is useful in the operation to correct optical axis misalignment.

In one or more embodiments of the present invention, a reference mark may be that which indicates a reference position either horizontally or vertically, or may indicate reference positions both horizontally and vertically. Marks may be arranged at specific intervals relative to the reference mark, in either the horizontal or vertical direction, or may be arranged at specific intervals, relative to the reference mark, in both the horizontal and vertical directions.

In one or more embodiments of the present invention, an image displaying device may comprise an operating portion that receives an indicator of the bar mark pairs to be a reference for adjusting an optical axis of the laser beams; and a controlling portion that adjusts an optical axis of the laser beams emitted from the laser beam sources by changing a modulation timing of the laser beam sources in accordance with the bar mark pair that has been indicated.

In one or more embodiments of this configuration, the user may be able to perform the correction of the optical axis misalignment by merely finding and indicating the bar mark pair wherein the bar marks overlay each other.

In one or more embodiments of the present invention, identification information may label the bar mark pairs and the operating portion may receive an input of the identification information of the bar mark pair as the indicator of the bar mark pairs.

For example, if, as a plurality of laser beam sources, a laser beam source that emits a red laser beam, a laser beam source that emits a green laser beam, and a laser beam source that emits a blue laser beam are provided, and if the structure is one wherein the display color for the identifying information for a bar mark pair is green, then, when compared to the case of red or blue, the identifying information for the bar mark pair, displayed on a black background, may be read more easily by the human eye.

In one or more embodiments of the present invention may enable the amount of optical axis misalignment of the laser beams of the individual color components to be ascertained easily, thus assisting in the operation to correct the optical axis misalignment.

BRIEF DESCRIPTIONS OF THE DRAWINGS

DETAILED DESCRIPTION OF THE INVENTION

One or more embodiments of the present invention may apply to a variety of image displaying devices that display color images by combining laser beams of different color components that are outputted from a plurality of laser beam sources, but, in the below, the explanation will use a laser projector as a specific example.

Figure 1:
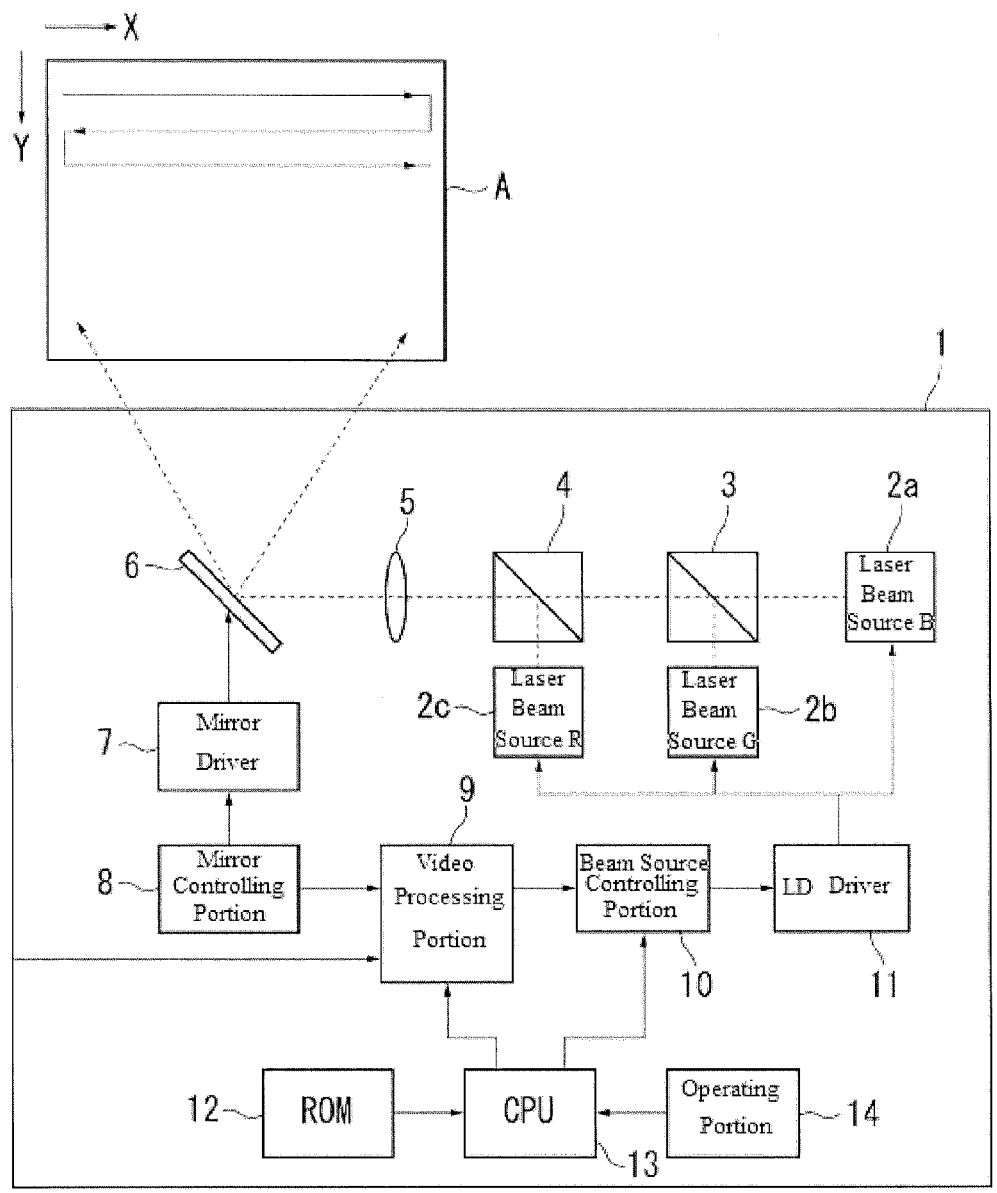
FIG. 1 is a diagram illustrating an example configuration of an image displaying device according to one or more embodiments of the present invention.

FIG. 1 illustrates an example configuration of a laser projector 1 according to one or more embodiments.

The laser projector 1 in one example may be structured from laser beam sources 2 (2a through 2c), various optical elements 3 through 5, a scanning mirror 6, and various driving and controlling units 7 through 11. In the laser projector 1, the individual laser beams of the red component (R), green component (G), and blue component (B) may be combined, and the combined beam may be projected onto a projection plane A, such as a screen or a wall, to project and display, on the projection plane A, a color image that depends on a video input signal. Moreover, in addition to these functional portions, the optical axes of the laser beams may be adjusted using a ROM (Read Only Memory) 12, a CPU (Central Processing Unit) 13, and an operating portion 14.

The respective laser beam sources 2 may be laser diodes (LDs) that output laser beams of mutually differing color components, and driven, mutually independently, by drive currents supplied individually from a laser driver 11, to each output a laser beam of a single color component. As a result, each may emit a monochromatic component laser beam of a specific wavelength, such as a blue component (B) from the laser beam source 2a, a green component (G) from the laser beam source 2b, and a red component (R) from the laser beam source 2c.

Dichroic mirrors 3 and 4, mirror elements having the property of reflecting only laser beams of specific wavelengths and transmitting the laser beams otherwise, may combine the laser beams of the individual color components emitted from the individual laser beam sources 2. Specifically, the B and G laser beams emitted from the laser beam sources 2a and 2b may be combined by the dichroic mirror 3 on the upstream side of the beam path and emitted to the dichroic mirror 4 on the downstream side of the beam path. In the dichroic mirror 4, this emitted combined beam may be further combined with the R laser beam emitted from the laser beam source 2c to be emitted as the final combined color beam.

In this way, the dichroic mirrors 3 and 4 may combine the R, G, and the B individual color component laser beams, and this combined color beam may be incident on to the scanning mirror 6 through a lens 5.

The scanning mirror 6 may be dislocated, scanning in the horizontal direction (X) and the vertical direction (Y), through a scanning mirror driver 7 that inputs a driving signal from a scanning mirror controlling portion 8, and the color beam incident thereon may be reflected in accordance with the deflection angle thereof to be projected onto the projection plane A. In one example, an MEMS (Micro Electro Mechanical System) scanning mirror, which is useful in miniaturization, reduced power consumption, increased processing speed, and the like, may be used as the scanning mirror 6.

The video processing portion 9 may send, to the beam source controlling portion 10, video data at specific time intervals based on a video signal inputted from the outside, such as from a personal computer, or from the CPU 13, and the beam source controlling portion 10 may obtain image information at specific scan positions thereby.

The beam source controlling portion 10, based on the image information, may control the laser driver 11 through a drive current waveform signal in order to project the video, comprising a plurality of pixels, in a projection range based on the image information.

The laser driver 11 may drive the individual laser beam sources 2a through 2c based on the control by the laser controlling portion 10 to cause them to output the individual color component laser beams.

When a drive current of at least a threshold current is supplied from the laser driver 11, the individual laser beam source 2 may output a laser beam, where the greater the drive current, the greater the intensity of the laser beam that is outputted. Moreover, if a current less than the threshold current is supplied, the individual laser beam source 2 may stop outputting the laser beam.

The ROM 12 may store image data of a test pattern used in correcting the optical axis misalignment. In one example, image data for a test pattern such as presented illustratively in FIG. 2 may be stored. That is, for a combination of two colors (for example, R and G), a test pattern may be used that includes a reference mark 21, shaped as a +, that is displayed by a mixed color wherein all of the color components of the two colors are combined, and a plurality of bar marks 22 (22*a* and 22*b*) displayed by the individual color components.

Figure 2:
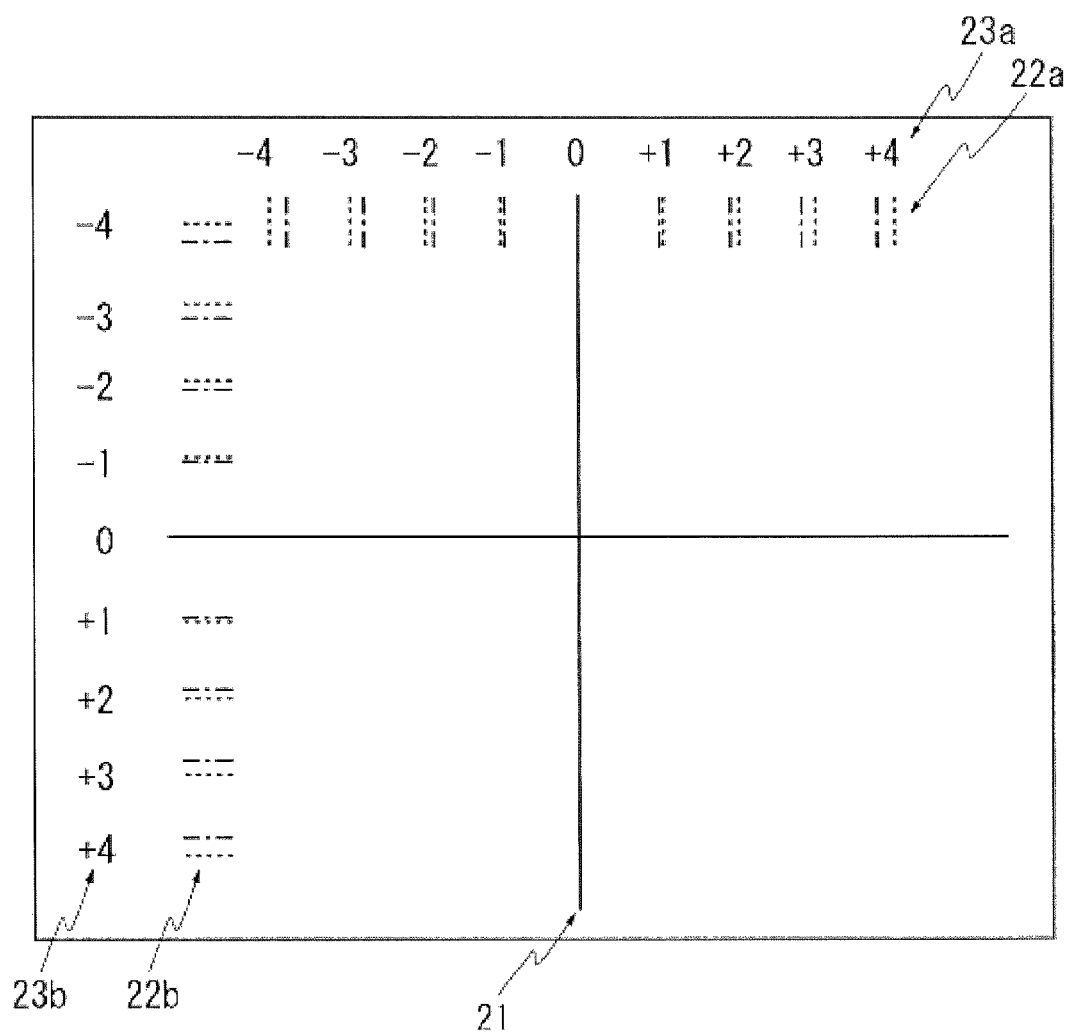
FIG. 2 is a diagram illustrating an example of a test pattern used in an image displaying device according to one or more embodiments of the present invention.

In the example of FIG. 2, for the colors for the reference mark 21 and bar marks 22, R is indicated by a dotted line, G is indicated by a line with dots and dashes, and yellow (the combined color wherein R and G are combined) is indicated by a solid line, to enable identification of the individual colors, but in practice all are displayed as solid lines.

In the example of FIG. 2, the reference mark 21 shows horizontal and vertical reference positions. A plurality of bar marks 22 for each color component is arranged at specific intervals in the horizontal and vertical directions relative to the reference mark 21. In one example, the bar marks 22*a* for the horizontal direction may be arranged on the top side of the reference mark 21, and the bar marks 22*b* for the vertical direction may be arranged at the left side of the reference mark 21. Conversely, another arrangement wherein the bar marks 22*a* for the horizontal direction are arranged at the bottom side of the reference mark 21 and the bar marks 22*b* for the vertical direction are arranged on the right side of the reference mark 21 may be used instead.

Here bar marks 22 of different color components referenced to a distance from the reference mark 21 may together form a pair, which will be termed a "bar mark pair." Given this, the arrangement of the individual bar marks 22 may be an arrangement wherein the amount of offset between the bar marks 22 in an individual pair is increased by a constant increment proportional to the distance from the reference mark 21. That is, the arrangement may be such that the amount of offset between the bar marks 22 in the individual bar mark pairs gradually increases when from moving from the center of the screen toward the outside (that is, the relative positional relationship between the two parallel lines is shifted a bit at a time). In order to form the arrangement wherein the amount of offset between the bar marks 22 is increased a bit at a time, the bar marks 22 of each individual color may be arranged with constant spacing, where that spacing is different for each individual color of the bar marks 22. In one example, one of the pairs of bar marks may be superimposed together when there is optical axis misalignment by having the amount of increase in the amount of offset between the bar marks 22 to match the thickness of the bar marks 22.

Moreover, the bar mark pairs in the horizontal direction are labeled with identifying information 23*a* that quantifies the relationships with the reference position in the horizontal direction, and the bar marks in the vertical direction are labeled with identifying information 23*b* that quantifies the relationships with the reference position in the vertical direction. The display color for the identifying information 23 (23*a* and 23*b*) may use R or G (and particularly G), which are colors that are easily read when using a black background. Moreover, the identifying information 23 may enable unique identification of each bar mark pair by the user, and may be expressed using letters, numbers, or the like.

The ROM 12 may store correction data corresponding to the respective horizontal and vertical identifying information 23 in the test pattern. The correction data may be specified by the amount of adjustment in the modulation timing of a laser beam source 2 corresponding to the amount of correction in the optical axes necessary to eliminate the existing amount of misalignment in the bar mark pairs (the amount of misalignment in the image data). This may use the change in the optical axis of the laser beam emitted from the applicable laser beam source 2 through a change in the modulation timing of the laser beam source 2. Instead, another structure may be used wherein the amount of misalignment of the bar mark pairs, or the amount of correction for the optical axes, may be specified in the correction data to produce the amount by which to adjust the modulation timing of the laser beam source 2 through a specific formula to convert from the amount of misalignment or the amount of correction.

Here the test pattern in the example of FIG. 2 is a test pattern for two of the R, G, and B colors, and can be used for correcting the optical axis misalignment for the laser beams of any of the colors through changing the combination of colors. For example, it is possible to correct all of the optical axis misalignment for R, G, and B by correcting the optical axis misalignment using a test pattern for the combination of R and G and correcting the optical axis misalignment using a test pattern for the combination of G and B (or R and B).

When an instruction to project the test pattern is received from a user through the operating portion 14, the CPU 13 may read in the image data for the test pattern from the ROM 12 and outputs it to the video processing portion 9. In one example, an instruction for the two colors that will be subject to optical axis misalignment correction may be received from a user, and a video signal obtained by applying that color information to the image data read out from the ROM 12 may be outputted to the video processing portion 9. This causes a test pattern that uses the two colors specified by the user to be displayed on the projection plane.

Moreover, when an indicator for a bar mark pair that will be the reference for correcting the optical axis misalignment is received from a user through the operating portion 14, the CPU 13 may read out from the ROM 12 the correction data that corresponds to the bar mark pair that has been indicated, and output it to the beam source controlling portion 10. This causes the optical axis of the laser beam that is emitted from the laser beam source 2 to be changed by an amount depending on the bar mark pair indicated by the user.

Figure 3:
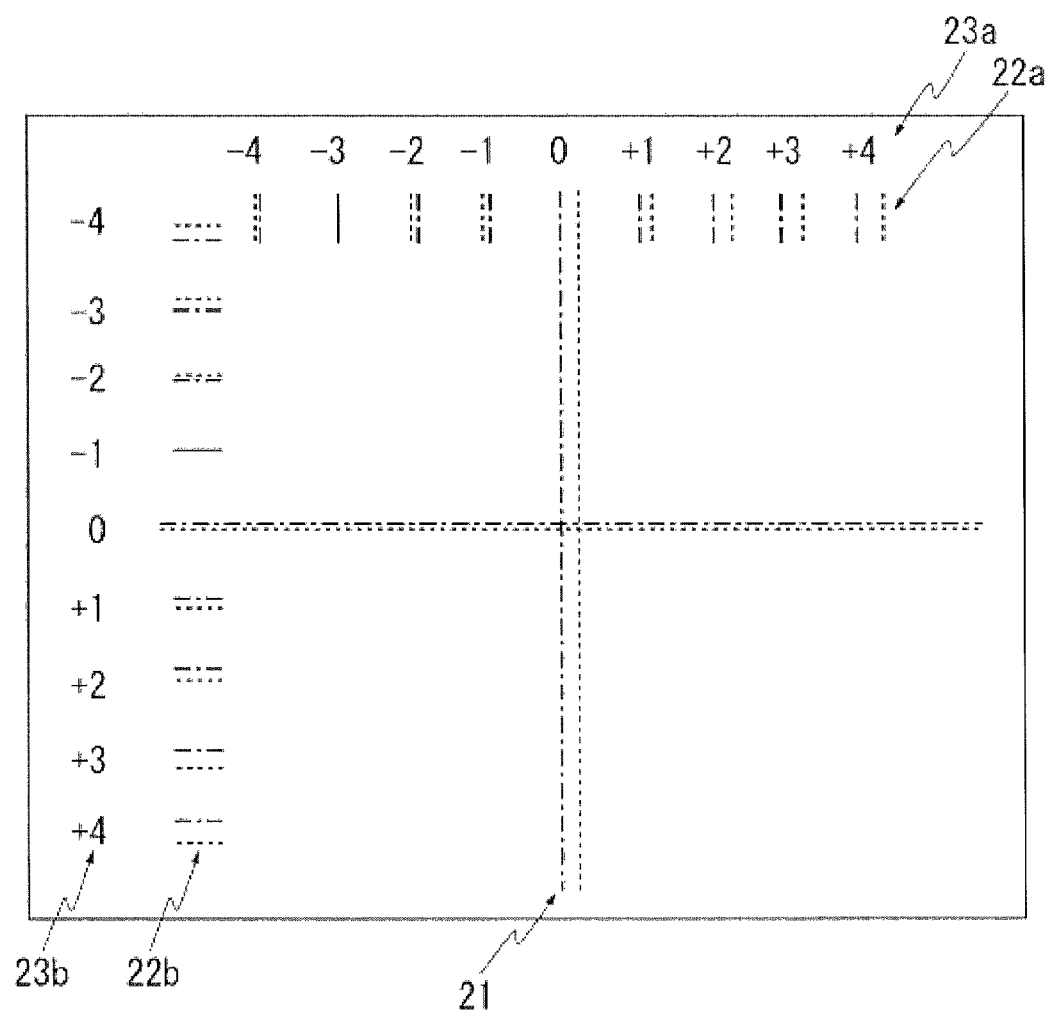
FIG. 3 is a diagram illustrating an example of projection of the test pattern when there is optical axis misalignment in an image displaying device according to one or more embodiments of the present invention.

An example of a case wherein correcting the optical axis misalignment for the combination of R and G was indicated by a user will be explained for a detailed example of optical axis misalignment correction. An example of projection of a test pattern when there is optical axis misalignment is shown in FIG. 3.

The display of the reference mark 21 on the projection plane will be explained first. If there is no optical axis misalignment in the R and G laser beams, then both the R laser beam and the G laser beam may be projected to the same location on the projection plane based on pixel values of identical coordinates. As a result, the reference mark 21 will be displayed on the projection plane in yellow (the mixed color of the mixture of R and G), which is the correct display color, as illustrated in FIG. 2.

On the other hand, if there is optical axis misalignment between the R and G laser beams, then even an R laser beam and a G laser beam based on pixel values having identical coordinates may be projected onto different locations on the projection plane. As a result, the reference mark 21, as illustrated in FIG. 3, may be displayed on the projection plane in a state wherein the R and G are separated.

Because the display of the reference mark 21 will vary depending on whether or not there is optical axis misalignment in this way, it is possible for the user to ascertain whether or not there is optical axis misalignment by observing the reference mark 21 that is displayed on the projection plane.

The display of the bar marks 22 on the projection plane will be explained next.

When there is optical axis misalignment in the horizontal direction in the R and G laser beams, then one of the pairs of the horizontal-direction bar marks may be overlapping. In the example in FIG. 3, of the horizontal-direction bar mark pairs, the bar mark pair labeled with the "−3" identifying information is overlapping and thus displayed in yellow (the mixed color that is the mixture of R and G) on the projection plane.

Moreover, when there is optical axis misalignment in the vertical direction in the R and G laser beams, then one of the pairs of the vertical-direction bar marks may be overlapping. In the example in FIG. 3, of the vertical-direction bar mark pairs, the bar mark pair labeled with the "−1" identifying information is overlapping and thus displayed in yellow (the mixed color that is the mixture of R and G) on the projection plane.

Because the display of the bar marks 22 may change in this way depending on the degree of optical axis misalignment, the user is able to ascertain quantitatively the degree to which the optical axes are misaligned (the amount of misalignment) by observing the bar marks 22 displayed on the projection plane. In this case, if the user operates the operating portion 14 to indicate "−3" in the horizontal direction and "−1" in the vertical direction, the timing of the modulation may be adjusted for the R laser beam source 2c and the G laser beam source 2b by the correction data that corresponds to these indicators. If there is a partial overlapping of bar mark pairs in two locations in the same direction, then the user can indicate the bar mark pair with the greater overlap.

While the explanation above was for a case wherein the user indicated the display of a test pattern, and the correction of optical axis misalignment, for a combination of R and G, it is possible to align all of the optical axes for R, G, and B by performing the same operation for a combination of G and B (or R and B) as well.

The modification to the modulation timings of the laser beam sources will be explained next with reference to FIG. 4. The example of FIG. 4 (*a*) illustrates a state wherein there has been no modification to the modulation timings for the individual laser beam sources 2, and the example of FIG. 4 (*b*) illustrates a state wherein the modulation timings of the individual laser beam sources 2 have been modified.

Figure 4:
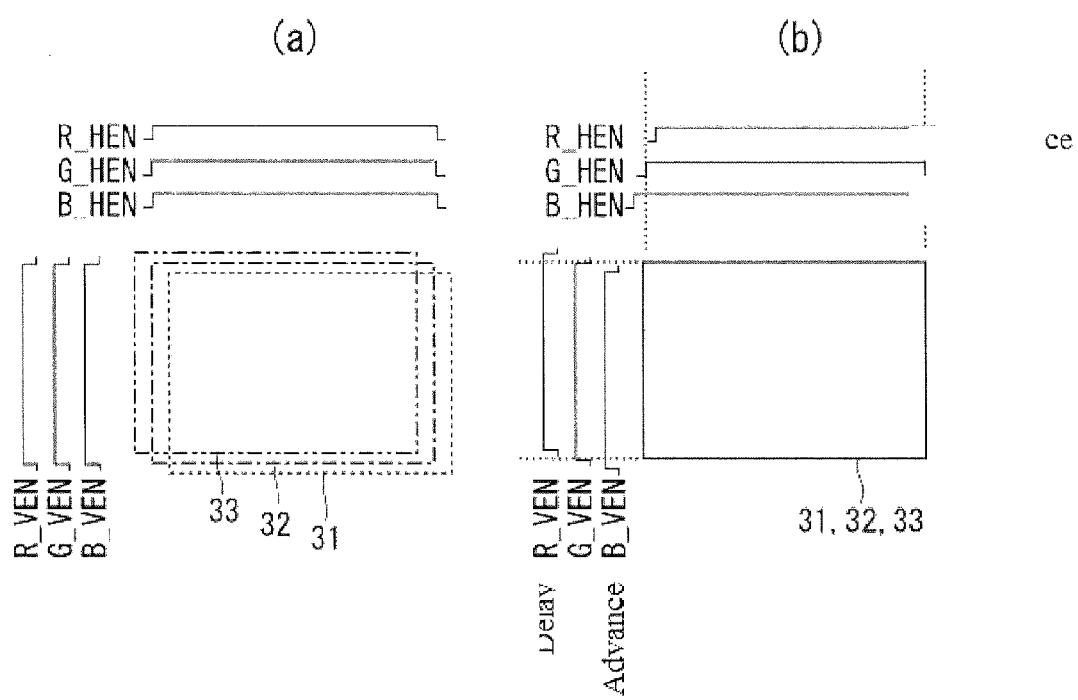
FIG. 4 is a diagram for explaining the relationship between the modulation timings of laser beam sources and the optical axis misalignment according to one or more embodiments of the present invention.

In the example shown in FIG. 4, the region 31 is the region of the projection plane that is scanned by the R laser beam, the region 32 is the region of the projection plane that is scanned by the G laser beam, and the region 33 is the region of the projection plane that is scanned by the B laser beam.

Moreover, R_HEN is the modulation timing for the horizontal scanning direction for the R laser beam source 2c, G_VEN is the modulation timing for the horizontal scanning direction for the G laser beam source 2b, and B_HEN is the modulation timing for the horizontal scanning direction for the B laser beam source 2a.

Moreover, R_VEN is the modulation timing for the vertical scanning direction for the R laser beam source 2c, G_VEN is the modulation timing for the vertical scanning direction for the G laser beam source 2b, and B_VEN is the modulation timing for the vertical scanning direction for the B laser beam source 2a.

In a state wherein there has been no modification in the modulation timings, R_HEN, G_HEN, and B_HEN may all be identical, and the R projection region 31 may be dislocated to the right relative to the G projection region 32, and the B projection region 33 may be dislocated to the left relative to the G projection region 32. In this case, as illustrated in FIG. 4 (*b*), the modulation timings in the horizontal scan direction of the R laser beam source 2c and the B laser beam source 2a may be modified to delay R_HEN relative to G_HEN, and to advance B_HEN relative to G_HEN. Doing so causes the respective R, G, and B projection regions 31, 32 and 33 to all be identical in the horizontal direction.

Moreover, in a state wherein there has been no modification in the modulation timings, R_VEN, G_VEN, and B_VEN may all be identical, and the R projection region 31 may be dislocated downward relative to the G projection region 32, and the B projection region 33 may be dislocated upward relative to the G projection region 32. In this case, as illustrated in FIG. 4 (*b*), the modulation timings in the vertical scan direction of the R laser beam source 2c and the B laser beam source 2a may be modified to delay R_VEN relative to G_VEN, and to advance B_VEN relative to G_VEN. Doing so causes the respective R, G, and B projection regions 31, 32 and 33 to all be identical in the vertical direction.

Performing the correction to the optical axes of the laser beams by modifying the modulation timings of the laser beam sources 2 is no more than an example, and the adjustments to the optical axes of the laser beams may be performed through another method instead. That is, a mechanism for controlling the arrangement of the laser beam sources 2 or the arrangement of the optical elements on the beam paths may be provided, and the optical axes of the laser beams may be adjusted through adjusting the arrangement of the laser beam sources 2 or of the optical elements.

Figure 5:
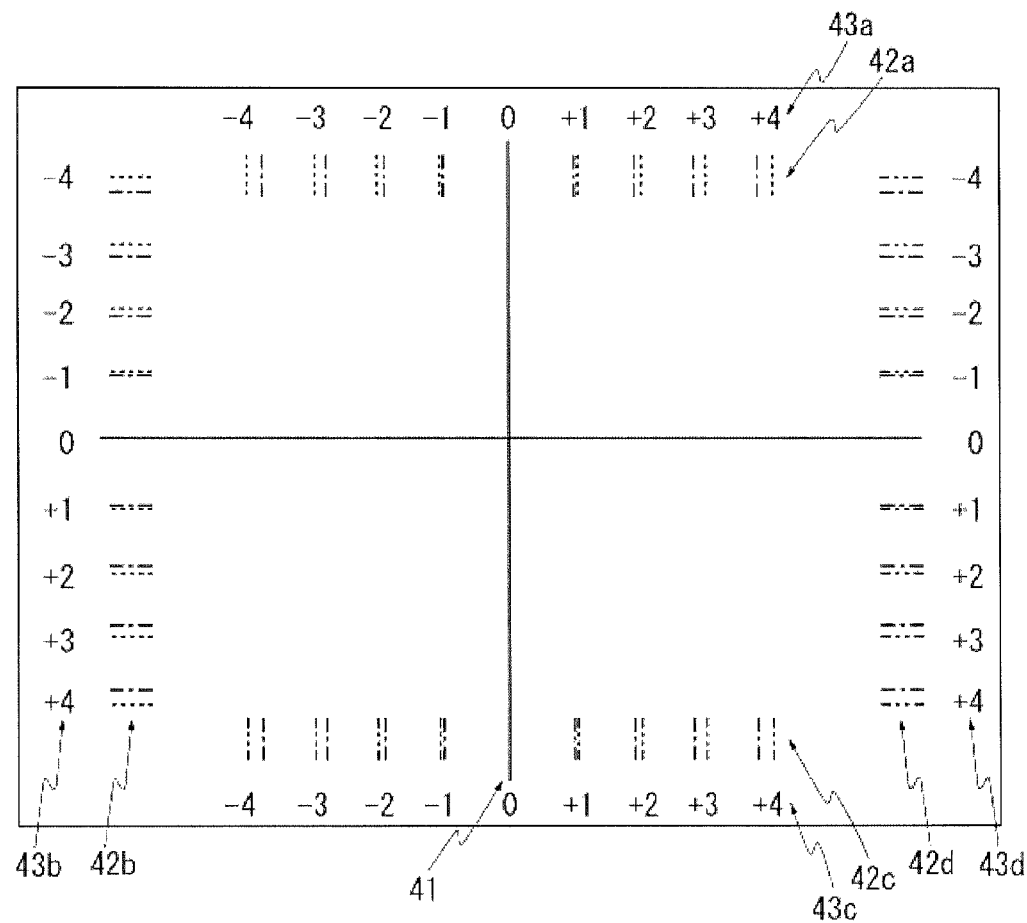
FIG. 5 is a diagram illustrating another example of a test pattern used in an image displaying device according to one or more embodiments of the present invention.
Figure 6:
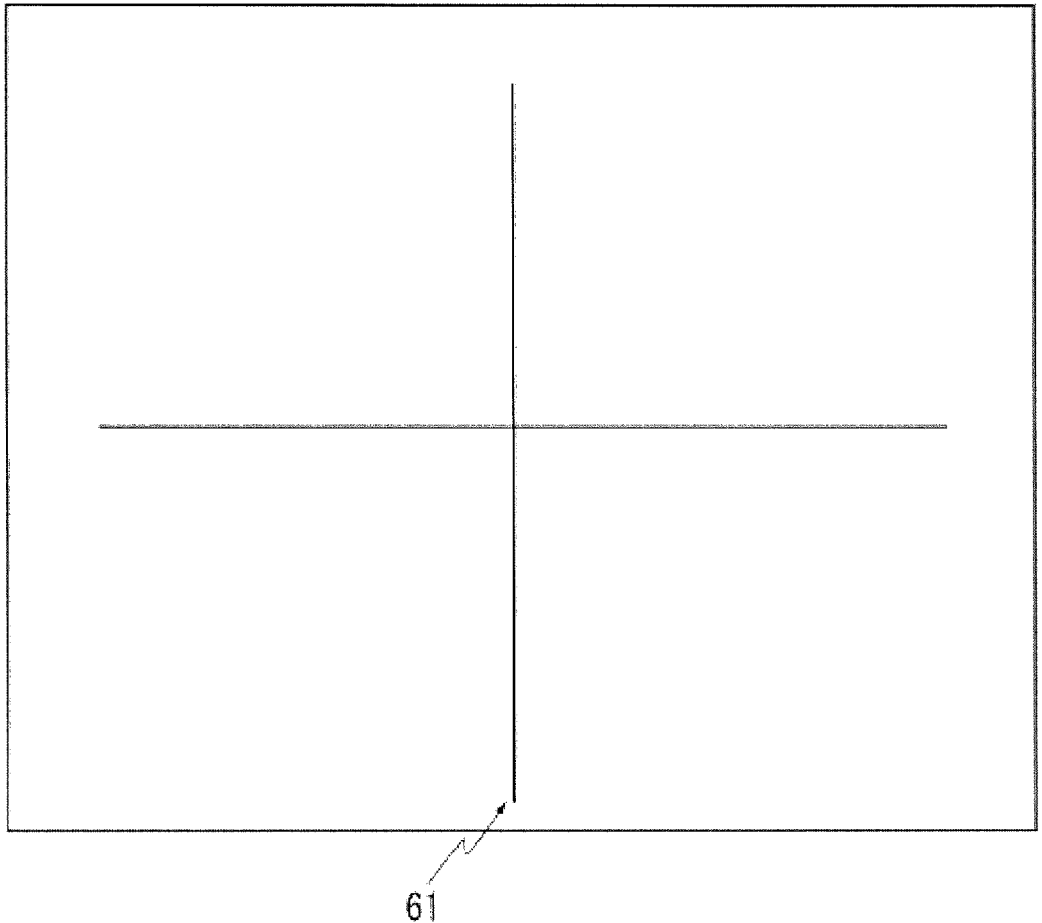
FIG. 6 is a diagram illustrating an example of a test pattern used in an image displaying device of a conventional approach.

FIG. 5 illustrates another example of a test pattern.

This test pattern includes a reference mark 41, in the shape of a +, displayed as a mixed color (white) combining all of the R, G, and B color components, and a plurality of bar marks 42 (42a, 42b, 42c, and 42d), displayed in the individual color components.

In the example of FIG. 5, for the colors for the reference mark 41 and the bar marks 42, R is indicated by dotted lines, G is indicated by dotted and dashed lines, the B is indicated by double-dotted dashed lines, and white (the mixed color of R, G, and B) is by solid lines, so as to identify the individual colors, but in practice all are displayed as solid lines.

In the example of FIG. 5, the reference mark 41 indicates the horizontal and vertical reference positions. The plurality of bar marks 42, for each of the color components, may be arranged at specific intervals in the horizontal and vertical directions relative to the reference mark 41. In one example, for the combination of R and G, horizontal-direction bar marks 42a may be arranged on the top side of the reference mark 41, and vertical-direction bar marks 42b may be arranged on the left side of the reference mark 41. Moreover, for the combination of G and B, horizontal-direction bar marks 42c may be arranged on the bottom side of the reference mark 41 and vertical-direction bar marks 42d may be arranged on the right side of the reference mark 41. These arrangements are no more than examples, and a different form of arrangement could be used instead.

Continuing with the example of FIG. 5, for the combination of R and G, the horizontal-direction bar marks are labeled with identifying information 43a wherein the relationships with the reference position in the horizontal direction are quantified, and the vertical-direction bar marks are labeled with identifying information 43b wherein the relationships with the reference position in the vertical direction are quantified. In addition, for the combination of G and B, the horizontal-direction bar marks are labeled with identifying information 43c wherein the relationships with the reference position in the horizontal direction are quantified, and the vertical-direction bar marks are labeled with identifying information 43d wherein the relationships with the reference position in the vertical direction are quantified.

In one or more embodiments, given this type of test pattern, the user is able to ascertain, by displaying the test pattern only once, the optical axis misalignment of the R and G laser beams and the optical axis misalignment of the G and B laser beams. Moreover, respectively indicating the identifying information 43a and 43b for the horizontal- and vertical-direction bar mark pairs, for the combination of R and G, and the identifying information 43c and 43d, for the horizontal- and vertical-direction bar mark pairs for the combination of G and B corrects the optical axis misalignment for all of R, G, and B.

As described above, with the laser projector according to one or more embodiments of the present invention, it is possible to ascertain quantitatively the degree of optical axis misalignment by finding the bar mark pairs wherein there is overlapping when the reference mark is displayed on the projection plane in a state wherein the color components are separated, thus making recalibration of the optical axes easy.

While the invention has been described with respect to a limited number of embodiments, those skilled in the art, having benefit of this disclosure, will appreciate that other embodiments can be devised which do not depart from the scope of the invention as disclosed herein. Furthermore, those of ordinary skill in the art would appreciate that certain components or "portions" of one or more embodiments of the present invention may be implemented by a circuit, processor, etc. using known methods. Accordingly, the scope of the invention should be limited only by the attached claims.

EXPLANATION OF CODES

1: Laser Projector
2 (2a through 2c): Laser Beam Sources
3, 4: Dichroic Mirrors
5: Lens
6: Scanning Mirror
7: Scanning Mirror Driver
8: Scanning Mirror Controlling Portion
9: Video Processing Portion
10: Beam Source Controlling Portion
11: Laser Driver
12: ROM
13: CPU
14: Operating Portion

What is claimed is:

1. An image displaying device comprising:
a plurality of laser beam sources that emit laser beams of mutually differing color components,
wherein the image display device projects, based on image data, an image by scanning the laser beams of the mutually differing color components emitted from the plurality of laser beam sources,
wherein the image data comprises image data of a test pattern that includes:
a reference mark that indicates horizontal and vertical reference positions by a mixed color of a plurality of color components of the mutually differing color components; and
a plurality of bar marks arranged at specific intervals in the horizontal and vertical directions relative to the reference mark, for each color component, is used, and
wherein arrangement of the bar marks in the image data is an arrangement in which:
a distance from the reference mark is used as a reference, and
for pairs of bar marks for bar marks of mutually differing color components, an amount of offset between bar marks in each of the bar mark pairs increases with fixed increments proportional to the distance from the reference mark.

2. The image displaying device as set forth in claim 1, further comprising:
an operating portion that receives an indicator of the bar mark pairs to be a reference for adjusting an optical axis of the laser beams; and
a controlling portion that adjusts an optical axis of the laser beams emitted from the laser beam sources by changing a modulation timing of the laser beam sources in accordance with the bar mark pair that has been indicated.

3. The image displaying device as set forth in claim 2, wherein identification information labels the bar mark pairs, and
wherein the operating portion receives an input of the identification information of the bar mark pair as the indicator of the bar mark pairs.

4. The image displaying device as set forth in claim 3, wherein the plurality of laser beam sources comprises:
a laser beam source that emits a red laser beam;
a laser beam source that emits a green laser beam; and
a laser beam source that emits a blue laser beam, and
wherein a display color for the identifying information for the bar marks is green.

5. An image displaying method comprising:
emitting laser beams of mutually differing color components;
projecting, based on image data, an image by scanning the laser beams of the mutually differing color components emitted;
using as the image data a test pattern that includes:
a reference mark that indicates horizontal and vertical reference positions by a mixed color of a plurality of color components of the mutually differing color components; and
a plurality of bar marks arranged at specific intervals in the horizontal and vertical directions relative to the reference mark, for each color component, is used, and
arranging the bar marks in the image data such that:
a distance from the reference mark is used as a reference, and
for pairs of bar marks for bar marks of mutually differing color components, an amount of offset between bar marks in each of the bar mark pairs increases with fixed increments proportional to the distance from the reference mark.

6. The image displaying method as set forth in claim 5, further comprising:
receiving an indicator of the bar mark pairs to be a reference for adjusting an optical axis of the laser beams; and adjusting an optical axis of the laser beams emitted from the laser beam sources by changing a modulation timing of laser beam sources that emit the laser beams in accordance with the bar mark pair that has been indicated.

7. The image displaying method as set forth in claim 6, further comprising:

using identification information to label the bar mark pairs; and receiving an input of the identification information of the bar mark pair as the indicator of the bar mark pairs.

8. The image displaying method as set forth in claim 7, wherein using as the plurality of laser beam sources a laser beam source that emits a red laser beam, a laser beam source that emits a green laser beam, and a laser beam source that emits a blue laser beam, and using green as a display color for the identifying information for the bar marks.

\* \* \* \* \*